(12) United States Patent
Oruc et al.

(10) Patent No.: US 11,967,739 B2
(45) Date of Patent: Apr. 23, 2024

(54) SEPARATOR PLATE AND ELECTROCHEMICAL SYSTEM

(71) Applicant: Reinz-Dichtungs-GmbH, Neu-Ulm (DE)

(72) Inventors: Ahmet Oruc, Neu-Ulm (DE); Thomas Stoehr, Laupheim (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 351 days.

(21) Appl. No.: 17/280,161

(22) PCT Filed: Sep. 26, 2019

(86) PCT No.: PCT/EP2019/076122
§ 371 (c)(1),
(2) Date: Mar. 25, 2021

(87) PCT Pub. No.: WO2020/064975
PCT Pub. Date: Apr. 2, 2020

(65) Prior Publication Data
US 2022/0006105 A1    Jan. 6, 2022

(30) Foreign Application Priority Data
Sep. 28, 2018  (DE) .......................... 202018105617.4

(51) Int. Cl.
*H01M 8/0254*  (2016.01)
*H01M 8/0256*  (2016.01)
(Continued)

(52) U.S. Cl.
CPC ....... *H01M 8/0254* (2013.01); *H01M 8/0256* (2013.01); *H01M 8/026* (2013.01); *H01M 8/0271* (2013.01)

(58) Field of Classification Search
CPC .......................... H01M 8/0254; H01M 8/0256
See application file for complete search history.

(56) References Cited

U.S. PATENT DOCUMENTS

2004/0115509 A1*  6/2004  Yoshida .............. H01M 8/0263
                                                    429/434
2010/0151347 A1   6/2010  Lemasson et al.
(Continued)

FOREIGN PATENT DOCUMENTS

DE    102015223040 A1    5/2017
DE    102016225432 A1    6/2018
(Continued)

OTHER PUBLICATIONS

ISA European Patent Office, International Search Report Issued in Application No. PCT/EP2019/076122, dated Dec. 10, 2019, WIPO, 4 pages.

*Primary Examiner* — Ula C Ruddock
*Assistant Examiner* — Sarika Gupta
(74) *Attorney, Agent, or Firm* — McCoy Russell LLP

(57) ABSTRACT

The invention relates to a separator plate for an electrochemical system, comprising a first and a second plate, which are essentially congruently arranged on top of one another. The first and/or second plates furthermore include at least one elongated projection, which protrudes on opposite sides from a plate plane of the separator plate and extends along the plate plane from an outer edge to an interior of the separator plate so that the projection of the first plate and/or the projection of the second plate, if necessary together, form a receptacle for a connector pin. The projection of the first plate or the projection of the second plate includes an indentation directed toward the respective opposite plate for fixing the connector pin in the receptacle in a force-fit and/or form-locked manner.

20 Claims, 12 Drawing Sheets

(51) Int. Cl.
    *H01M 8/026*     (2016.01)
    *H01M 8/0271*     (2016.01)

(56) References Cited

U.S. PATENT DOCUMENTS

2010/0304264 A1    12/2010    Wakahoi et al.
2019/0088956 A1*    3/2019    Glueck ............... H01M 8/0254

FOREIGN PATENT DOCUMENTS

| | | |
|---|---|---|
| JP | 2001256991 A | 9/2001 |
| JP | 2004288426 A | 10/2004 |
| WO | 2018114819 A1 | 6/2018 |

\* cited by examiner

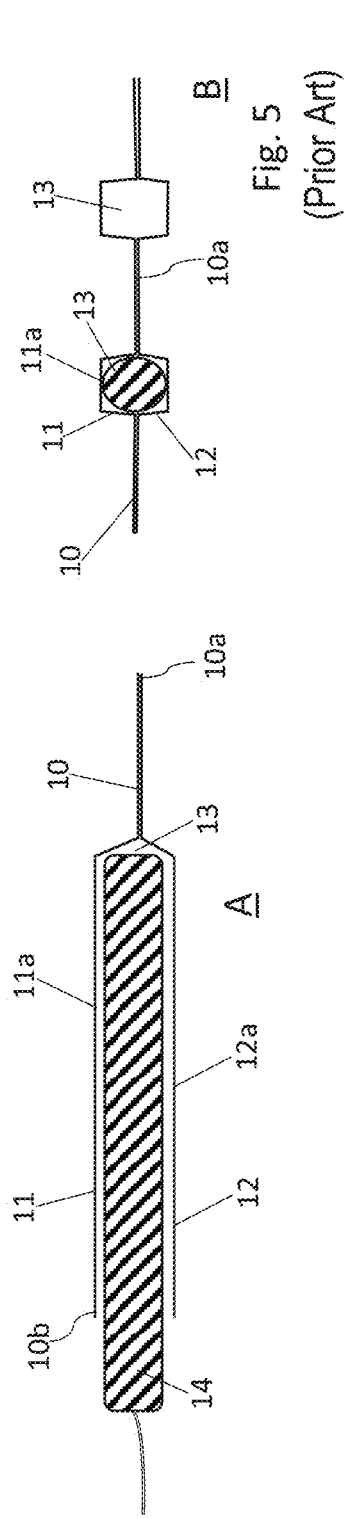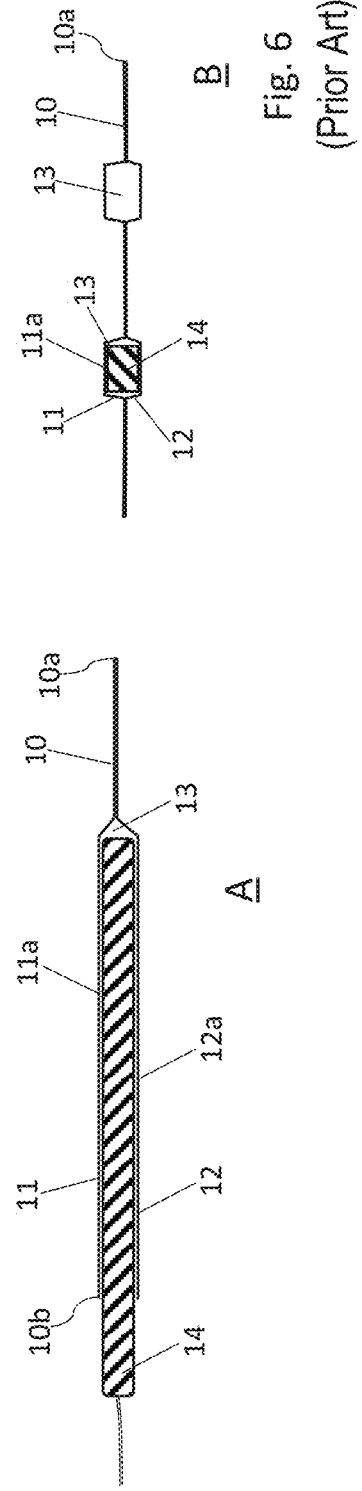

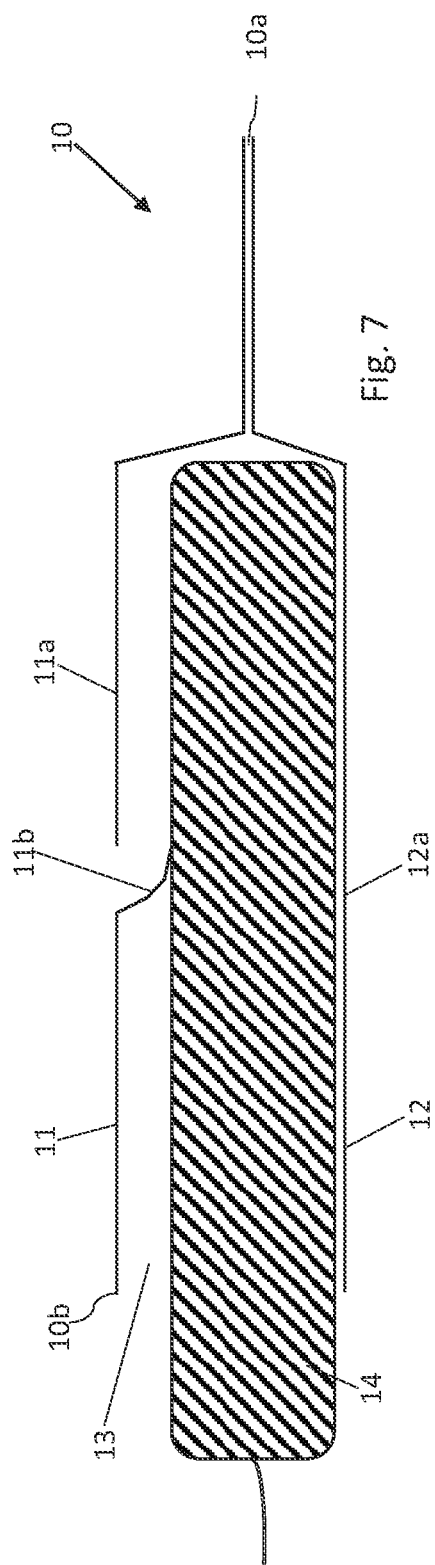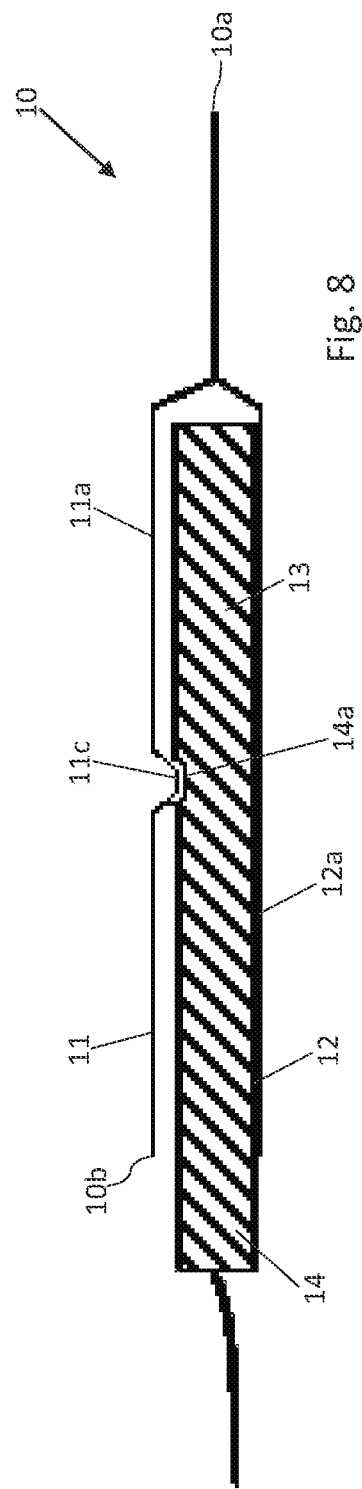

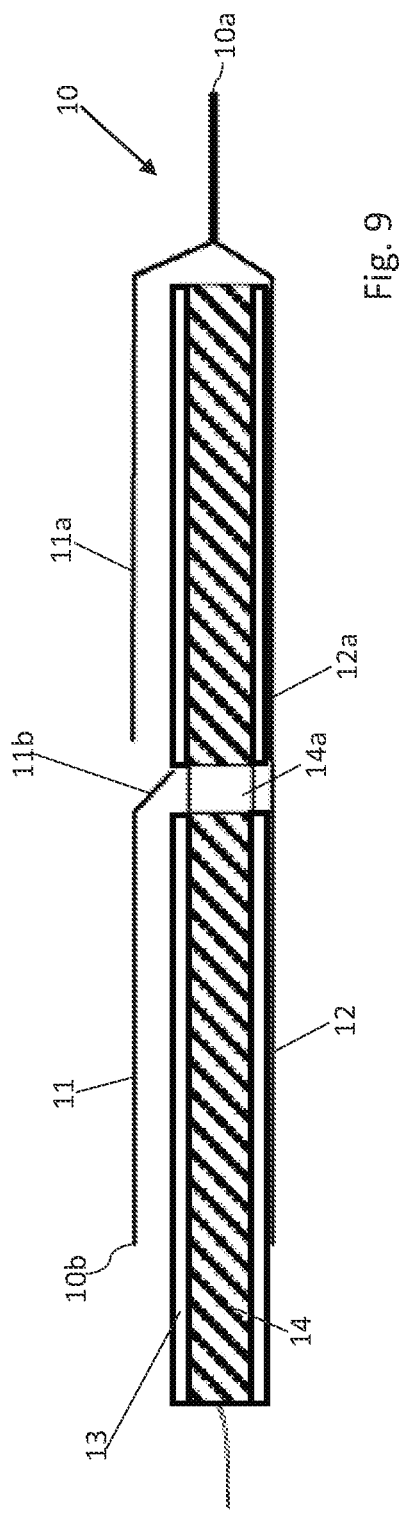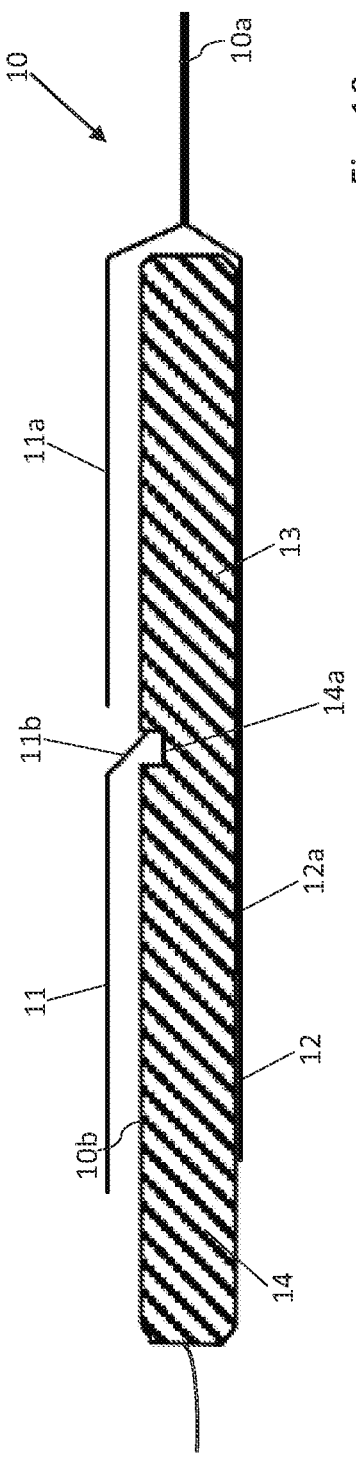

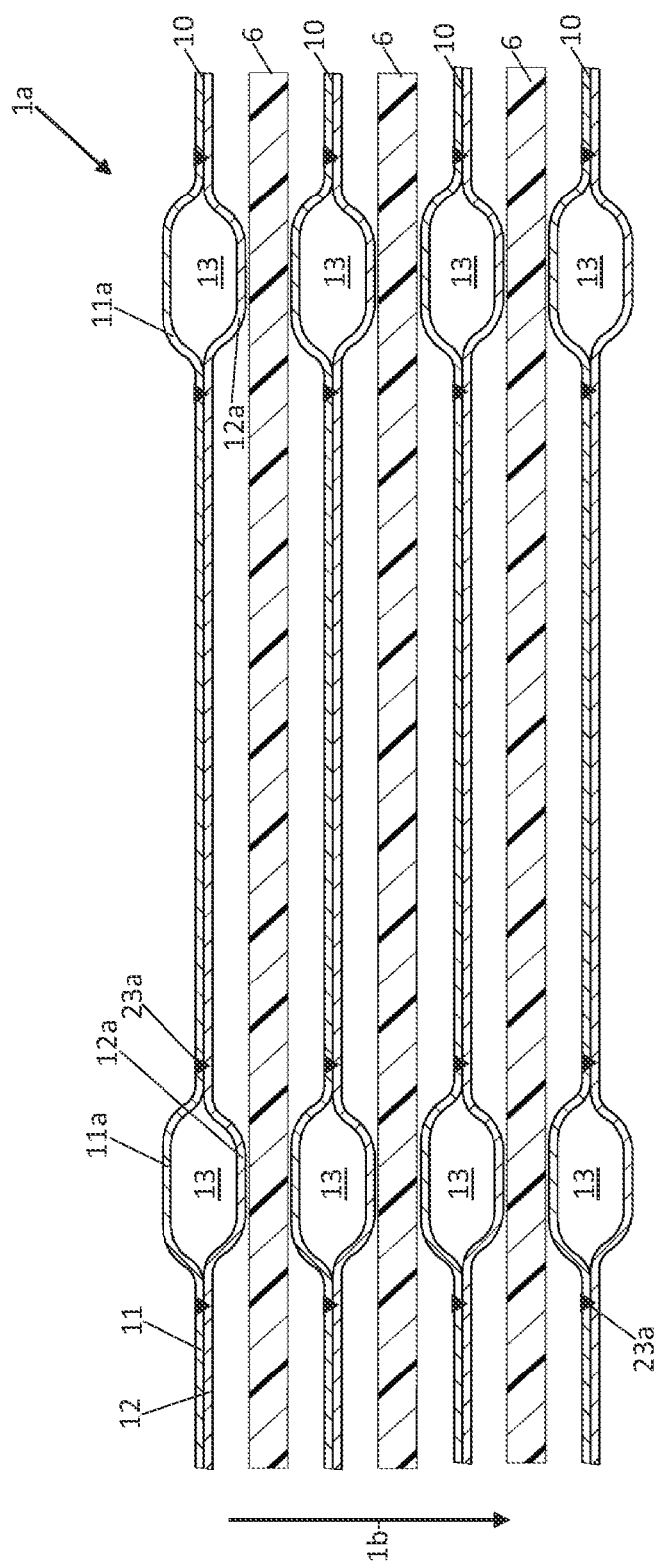

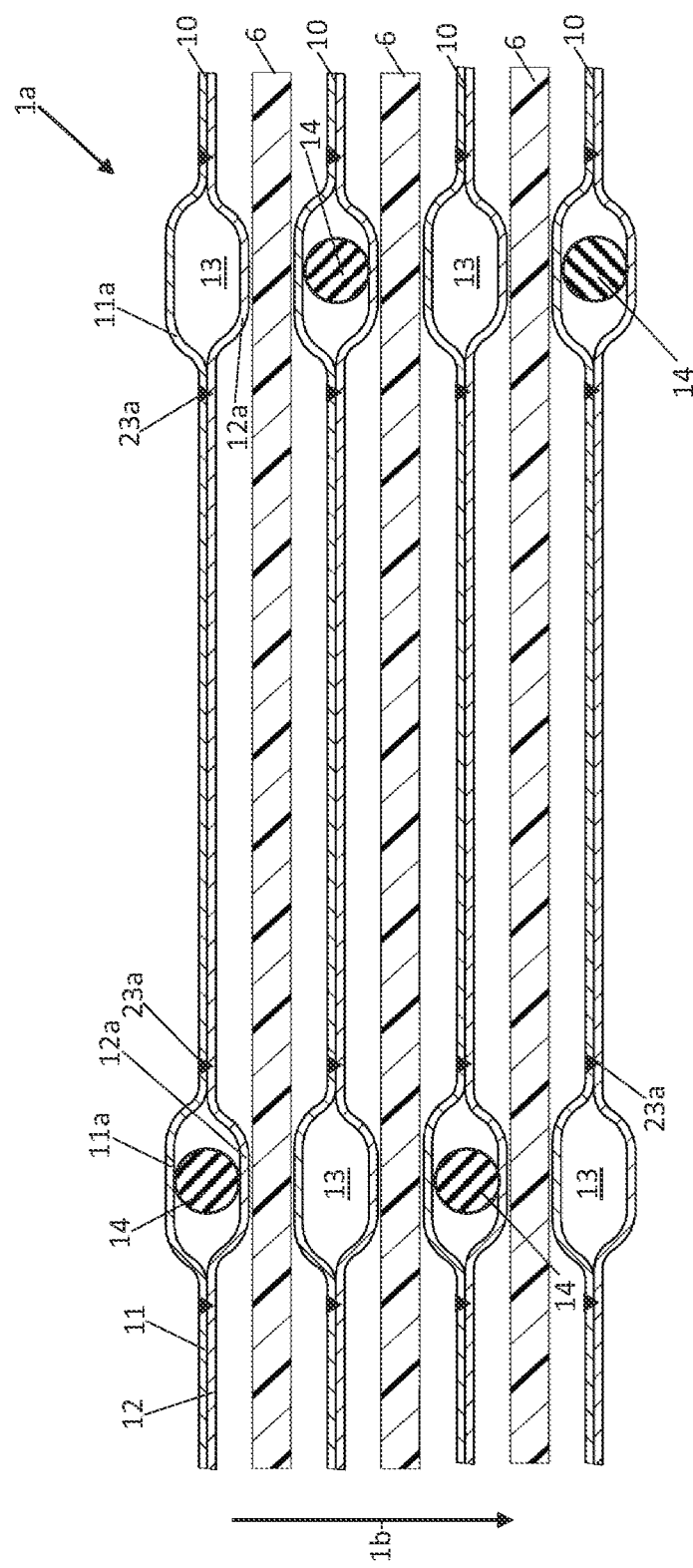

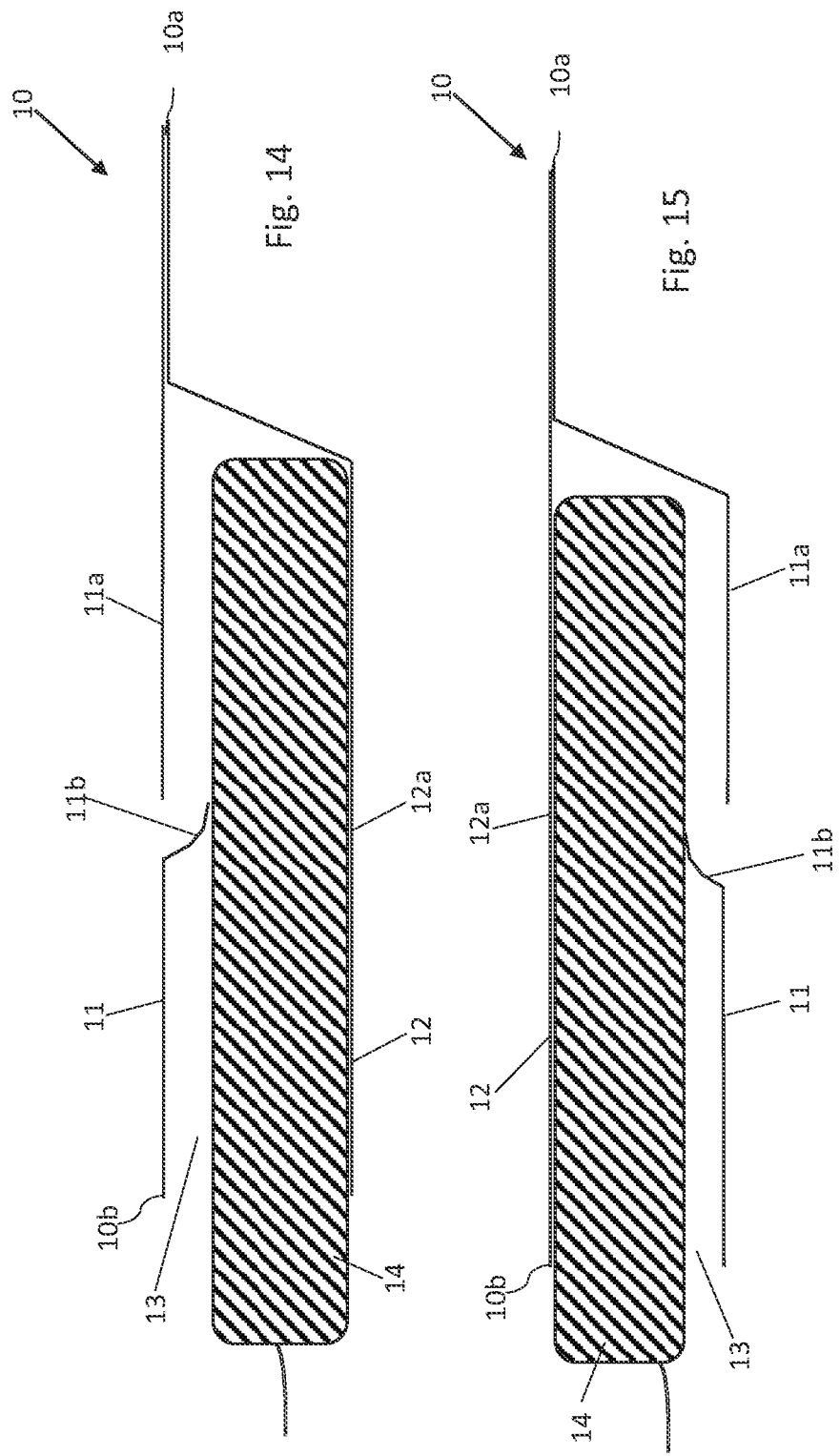

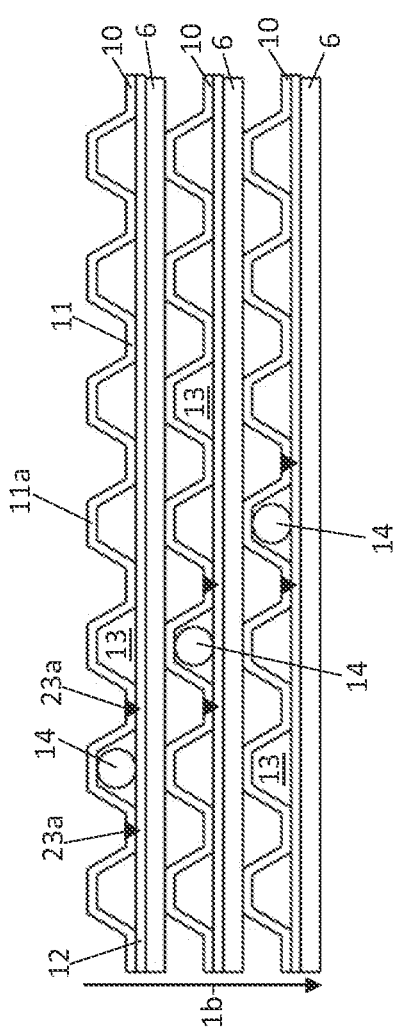
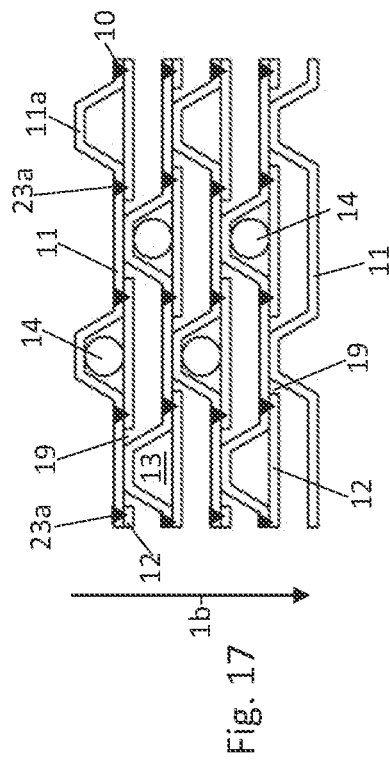
Fig. 16
Fig. 17

SEPARATOR PLATE AND ELECTROCHEMICAL SYSTEM

CROSS-REFERENCE TO RELATED APPLICATION(S)

The present application is a U.S. National Phase of International Patent Application Serial No. PCT/EP2019/076122, entitled "SEPARATOR PLATE AND ELECTROCHEMICAL SYSTEM," filed on Sep. 26, 2019. International Patent Application Serial No. PCT/EP2019/076122 claims priority to German Patent Application No. 20 2018 105 617.4, filed on Sep. 28, 2018. The entire contents of each of the above-mentioned applications are hereby incorporated by reference in their entirety for all purposes.

TECHNICAL FIELD

The present invention relates to a separator plate for an electrochemical system and to an electrochemical system comprising a plurality of separator plates arranged in parallel.

BACKGROUND AND SUMMARY

The separator plate can be used for a fuel cell system, for example, in which electrical power is produced from hydrogen and oxygen. The separator plate can also be used for an electrolyzer, in which hydrogen and oxygen are produced from water by applying a potential. The separator plate can likewise be used for an electrochemical compressor, in which molecular hydrogen is transported through the membrane by way of oxidation/reduction by applying a potential, while being compressed at the same time. The electrochemical system according to the invention can thus comprise one of the aforementioned electrochemical systems.

Separator plates for an electrochemical system usually comprise a pair of plates including two individual metallic plates, wherein two separator plates in each case delimit an electrochemical cell, that is, a fuel cell, for example. One individual plate, in the narrower sense, belongs to one cell, and the other individual plate of the separator plate already belongs to the next cell. In an electrochemical system, a plurality of electrochemical cells, for example as many as 400, are typically stacked in series to form a sequence or stack. The cells themselves usually comprise not only two half separator plates, but also a membrane electrode assembly, also referred to as an MEA, which is arranged between the separator plates, and a respective gas diffusion layer (GDL), which is made of electrically conductive carbon non-woven, for example, on both sides of the MEA. The entire stack is held together between two end plates by way of a clamping system and is subjected to predetermined pressing.

In addition to delimiting the electrochemical cells, the separator plates perform several additional functions in an electrochemical system, these being, on the one hand, electrically contacting the electrodes of the different electrochemical cells and passing the current on to the respectively adjacent cell, and, on the other hand, supplying the cells with the reaction media and disposing of the reaction products, furthermore cooling the electrochemical cells and conducting the waste heat, as well as sealing the compartments of the two different reaction media and of the coolant with respect to one another and with respect to the outside.

Through-openings for reaction media, this is, usually, in particular hydrogen or methanol on the one hand, and in particular air or oxygen on the other hand, as well as coolants, typically mixtures of demineralized water and anti-freeze, are accordingly formed in the two individual metallic plates of the separator plate, for supplying the electrochemical cells. A distribution structure is furthermore integrally formed in each of the two individual metallic plates, whereby channels are formed on the two surfaces of the two individual plates. A reaction medium is conducted on each of the outwardly directed surfaces of the separator plate, and the coolant is conducted in the space between the two individual metallic plates. The region that, in an orthogonal projection into a shared plane with the MEA, coincides with the actual membrane, and not with the edge region thereof or the sealing structure thereof, is also referred to as the electrochemically active region of the separator plate. A reaction medium is conducted in a channel structure in this electrochemically active region of the separator plate, on the surface of the separator plate facing the MEA. A distribution region, likewise including channel-like distribution structures, usually adjoins on two sides of the electrochemically active region. Each of the distribution structures communicates with at least two of the through-openings, namely at least one inlet and at least one outlet for the particular fluid. For sealing with respect to the outside, a respective sealing structure is arranged in each of the individual metallic plates, extending at least continuously circumferentially around the electrochemically active region of the separator plate and, if necessary, around at least a portion of the through-openings, the sealing structure being arranged at a distance from the electrochemically active region or the particular edge of the through-opening. In addition, individual through-openings can also be sealed by a sealing structure that extends continuously circumferentially around the particular through-opening, so as to be sealed with respect to one another.

So as to check whether the electrochemical cells supply sufficient cell voltage (cell voltage measurement, CVM), the individual cells are electrically contacted at the edge of the separator plates. This contacting has to be mechanically stable and vibration-resistant so as to also be able to check the cell voltage during ongoing operation, for example during use in a vehicle. In the past, connectors in the form of cylindrical pins, for example, were clamped for this purpose between the individual plates of a separator plate, or engaged on the separator plate or on the housing by means of additional hook elements. Hook elements have an increased space requirement, either on the separator plate or at the housing, but are necessary to prevent the connector from detaching as a result of vibration or dynamic loads. Pins clamped between the anode and cathode are only common on the test bench and are not reliable during long-term use in the vehicle.

It is thus an object of the present invention to provide a separator plate and a corresponding electrochemical system, which enable secure, and also space-saving, contacting of the separator plate.

In a first variant, the separator plate according to the invention for an electrochemical system comprises a first plate and a second plate, wherein the first and second plates are essentially congruently arranged on top of one another, wherein the first and second plates each include at least one elongated projection, wherein the projection of the first plate and the projection of the second plate protrude from a plate plane of the separator plate on opposite sides and extend along the plate plane parallel on top of one another, from an outer edge to an interior of the separator plate, so that the projection of the first plate and the projection of the second plate together form a receptacle for a connector pin. The separator plate according to the invention is characterized in that the projection of the first plate, or the projection of the second plate, includes an indentation that is directed toward the respective opposite plate for fixing the connector pin in the receptacle in a force-fit and/or form-locked manner.

In a second variant, the separator plate according to the invention for an electrochemical system comprises a first plate and a second plate, wherein the first and second plates are essentially congruently arranged on top of one another, wherein the first or second plate includes at least one elongated projection, wherein the projection of the first plate or the projection of the second plate protrudes from a plate plane of the separator plate toward the side directed away from the other plate and extends along the plate plane, from an outer edge to an interior of the separator plate, so that the projection of the first plate or the projection of the second plate forms a receptacle for a connector pin. The separator plate according to the invention is characterized in that the projection of the first plate or the projection of the second plate, or a region in the second plate located opposite the projection of the first plate or a region in the first plate located opposite the projection of the second plate, includes an indentation directed toward the respective opposite plate for fixing the connector pin in the receptacle in a force-fit and/or form-locked manner.

A plate plane of the separator plate here shall, in particular, be understood to mean a contact plane between the first plate and the second plate in the vicinity of the projection(s) in which the first and second plates make contact when these are arranged on top of one another for forming the separator plate. The plate plane of the separator plate can usually also be understood to mean a contact plane between planar, non-deformed regions of the first and second plates The indentation for fixing the connector pin in the receptacle in a force-fit and/or form-locked manner enables a force-fit and/or form-locked connection of the connector pin to the separator plate, which is mechanically stable and vibration-resistant. The invention furthermore enables secure contacting, without an additional locking element, and thus has a low space requirement.

The projection can, in particular, be embossed into the first and/or second plates. If the projection, for forming a receptacle, is integrally formed in the first and second plates, the depth of the particular projection in a direction perpendicular to the plate plane may be different in the two plates.

The indentation can be designed as a cut-out tab. This tab can be produced, for example, by being stamped out of the first or second plate. The indentation can also be designed as a dome-shaped embossment.

The first and/or second plates can, if necessary each on opposite sides of the plate plane, comprise a plurality of projections that protrude from the plate plane of the separator plate and that extend, if necessary in pairs parallel on top of one another, from the outer edge to the interior of the separator plate, so that the plurality of projections of the first and/or second plates form a plurality of receptacles for connector pins. In the case of a plurality of receptacles for connector pins, these can be arranged within a stack of separator plates offset from one another from separator plate to separator plate, preferably in a direction parallel to the plate plane, so that convenient insertion, and if necessary removal, of the connector pins is made possible. This is, in particular, advantageous in the case of connector pins that become thicker toward the outside or associated connecting lines. While in this way many of the receptacles remain unassigned, all first or second plates of the separator plates can thus each be worked in one work step using the same tool, for forming the projections. In particular, the first or second plates can each be worked in one embossing step using the same embossing tool, for forming the projections.

It is particularly preferred when the separator plate includes two, three or four receptacles for connector pins which are arranged next to one another.

The first and second plates can essentially have a rectangular, square or trapezoidal shape, in particular with rounded corners. The projections can preferably be provided in the region of corners of the first and/or second plates. Furthermore, the projections can preferably extend at an angle with respect to the outer edge, the angle being >0° and <180°, preferably >45° and ≤90°, or preferably ≥90° and <135°, particularly preferably ≥80° and/or ≤100°, or particularly preferably 90°. The angle is defined as an angle that opens from the outer edge of the separator plate toward the interior of the separator plate.

The receptacle preferably has a cross-section that corresponds to a cross-section of the connector pin so as to allow the connector pin to be firmly seated in the receptacle. In particular, the receptacle can have a square, rectangular, hexagonal or honeycomb-shaped cross-section, wherein corners of these cross-sectional shapes can be tapered or rounded. The cross-section of the receptacle and the cross-section of the connector pin to be accommodated can preferably be dimensioned with respect to one another in such a way that no oversized clearance arises between the receptacle and the connector pin to be accommodated, but that, at the same time, insertion without great effort is made possible. The actual fixation of the connector pin is carried out by the connector pin resting in the receptacle, so that the indentation and the connector pin rest against one another in a force-fit and/or form-locked manner.

It is particularly advantageous when the first and second plates of the separator plate comprise metallic materials or metal alloys or are formed thereof, wherein the metallic materials or metal alloys have sufficient elasticity due to the material properties or shape factors thereof. These are, above all, stainless steels, titanium, or combinations of nickel, chromium or other transition metals. The modulus of elasticity of the materials advantageously ranges between 100 GPa and 250 GPa, and in particular between 160 GPa and 220 GPa, in each case including or excluding the aforementioned limits.

In an advantageous embodiment of the invention, the first plate and the second plate can each include at least one mutually aligned first through-opening for conducting a reaction medium through the separator plate, can each include at least one mutually aligned second through-opening for conducting a coolant through the separator plate, can each include, on the surface facing away from one another, an active region including guidance structures for guiding a reaction medium along the plate plane, and a distribution region, which is in fluid connection with the first through-opening and the active region and includes distribution structures, for distributing a reaction medium to be introduced into the active region from the first through-opening and/or for collecting a reaction medium flowing from the active region toward the first through-opening.

The first and second plates can each furthermore, in particular, include two mutually aligned pairs of first through-openings, wherein one pair of the first through-openings is configured for supplying a reaction medium to the active region, and the other pair of the first through-openings is configured for discharging a reaction medium from the active region. In addition, the first and second plates can each include two mutually aligned pairs of second through-openings, which are used to supply or discharge a coolant.

The first and second plates can each furthermore include a first sealing structure, extending circumferentially around one of the first through-openings, for sealing the particular first through-opening along the plate plane, wherein the first sealing structure includes at least one first passage, by way of which the first through-opening is in fluid connection with the distribution region and the active region.

The first and second plates can each moreover include at least one second sealing structure for sealing the second through-openings along the plate plane.

The first and second plates can each additionally include a third sealing structure, which extends circumferentially around the active region, the distribution region(s) and the first through-openings, and seals these with respect to the surrounding area along the plate plane. The second through-opening(s) can be arranged inside or outside the region surrounded by the third sealing structure. The projections of the first and second plates can preferably be located outside the region surrounded by the third sealing structure.

The first, second and/or third sealing structures can be embossed into the first or second plate, or be designed as sealing beads that are embossed into the first and second plates. The third sealing structure, if it is designed as a sealing bead, is frequently also referred to as a perimeter bead.

It is furthermore advantageous when the first, second and third sealing structures of the first plate, and the first, second and third sealing structures of the second plate protrude from the plate plane of the separator plate on opposite sides, and a height of the projections, by which the projections protrude from the plate plane of the separator plate, is less than a height of the first, second and third sealing structures, by which the first, second and third sealing structures protrude from the plate plane of the separator plate. In this way, it is ensured that the sealing structures can also exhibit a sufficient sealing action in the vicinity of the projections.

The invention furthermore encompasses an electrochemical system comprising a plurality of above-described separator plates that are arranged in parallel.

A respective membrane of an electrochemical cell can be arranged between two adjacent separator plates for converting chemical energy into electrical power. The membrane usually comprises an electrochemically active region and an edge region terminating the membrane at the outer edge thereof. The projections for accommodating the connector pins are usually arranged so as to be located in regions of the separator plate that abut the edge region, but not the actual membrane region of the MEA. These are thus preferably located outside the region of the separator plate which is enclosed by the perimeter bead.

The electrochemical system can furthermore comprise a device for checking a cell voltage of a separator plate, wherein the device, for the connection to the plurality of separator plates, comprises a plurality of connector pins, each connector pin being insertable into a respective receptacle for a connector pin of a separator plate.

The connector pins can have a substantially cylindrical or cuboid design, in particular having rounded corners, that is, a round, rectangular or rounded-polygonal cross-section. The connector pins can furthermore have a cross-section that corresponds to the cross-section of the receptacles, but an oversized dimension of the connector pin compared to the interior space of the receptacle must be avoided, if necessary excluding the bearing point at the indentation.

It is particularly preferred when the connector pins have a recess, corresponding to the indentation, for fixing the connector pins in the receptacles in a force-fit and/or form-locked manner.

In particular, the recess can be designed as a groove and/or as a groove extending circumferentially around the connector pin in a transverse direction.

The force-fit and/or form-locked fixation of the connector pins in the receptacles can be reversible or irreversible. An irreversible fixation, in which the connector pins can no longer be removed from the receptacles, is particularly reliable against an inadvertent detachment of the connection. In contrast, a reversible fixation, in which the connector pins can be removed from the receptacles in a controlled manner, allows multiple recontacting of the separator plates, for example when individual separator plates of a stack have to be replaced.

It is particularly advantageous when the connector pins are insertable into a respective receptacle of a separator plate offset from one another in a direction perpendicular to the plate plane. It is in particular advantageous when, in a projection of n adjacent separator plates in a direction perpendicular to the plate plane of the separator plates, where $n \geq 1$ and/or $n \leq 4$, the connector pins are insertable into the separator plates offset from one another. Insertable offset can, in particular, be understood to mean that the connector pins are insertable offset by one receptacle from separator plate to separator plate, in a direction parallel to the plate plane. The connector pins can furthermore alternate from separator plate to separator plate, and in particular in the case of only two receptacles that are arranged next to one another in a separator plate, can each be insertable into a respective receptacle of a separator plate. Other arrangements are possible, but usually result in smaller distances between the connector pins.

It is likewise possible that not all separator plates are identically designed, for example that two types of separator plates are manufactured and stacked alternately. In this case, it is possible that projections of a first separator plate abut recesses in the directly adjacent individual plate of the closest separator plate or in the entire directly adjacent separator plate. This is particularly advantageous for the aforementioned second variant, since in this way more installation space is available for a projection of a receptacle which is only formed in one of the two plates of the separator plate. In this solution, the height of this projection in an individual plate can also be identical to or greater than the height of the first, second and third sealing structures of the same individual plate. However, it is preferred that here as well the height of this projection in an individual plate is less than the sum of the heights of the mutually corresponding first sealing structures of the two individual plates and/or the sum of the heights of the mutually corresponding second sealing structures of the two individual plates and/or the sum of the heights of the mutually corresponding third sealing structures of the two individual plates.

A separator plate according to the invention and an electrochemical system according to the invention are described hereafter in greater detail based on figures. Different elements that are essential to the invention, or elements providing advantageous refinements, are described in each case within the scope of a specific example, wherein it is also possible to use individual of these elements per se to refine the invention, including detached from the context of the particular example and further features of the particular example. Moreover, identical or similar reference numerals are used for identical or similar elements in the figures, and the explanation thereof is therefore partially omitted.

BRIEF DESCRIPTION OF THE FIGURES

FIGS. 5A and 5B show a first receptacle-connector pin connection according to the prior art in a longitudinal view and a cross-sectional view, FIGS. 6A and 6B show a second receptacle-connector pin connection according to the prior art in a longitudinal view and a cross-sectional view, FIG. 7 shows a receptacle-connector pin connection for an electrochemical system according to a first exemplary embodiment in a longitudinal sectional view, FIG. 8 shows a receptacle-connector pin connection for an electrochemical system according to a second exemplary embodiment in a longitudinal sectional view, FIG. 9 shows a receptacle-connector pin connection for an electrochemical system according to a third exemplary embodiment in a longitudinal sectional view, FIG. 10 shows a receptacle-connector pin connection for an electrochemical system according to a fourth exemplary embodiment in a longitudinal sectional view, FIG. 11 shows a cross-section through a portion of an electrochemical system according to the invention prior to accommodating connector pins, FIG. 12 shows a cross-section through a portion of an electrochemical system according to the invention with a first arrangement of connector pins, FIG. 14 shows a receptacle-connector pin connection for an electrochemical system according to a fifth exemplary embodiment in a longitudinal sectional view, FIG. 15 shows a receptacle-connector pin connection for an electrochemical system according to a sixth exemplary embodiment in a longitudinal sectional view, FIG. 16 shows a cross-section through a portion of an electrochemical system according to the invention with a third arrangement of connector pins, FIG. 17 shows a cross-section through a portion of an electrochemical system according to the invention with a fourth arrangement of connector pins.

DETAILED DESCRIPTION

Figure 1:
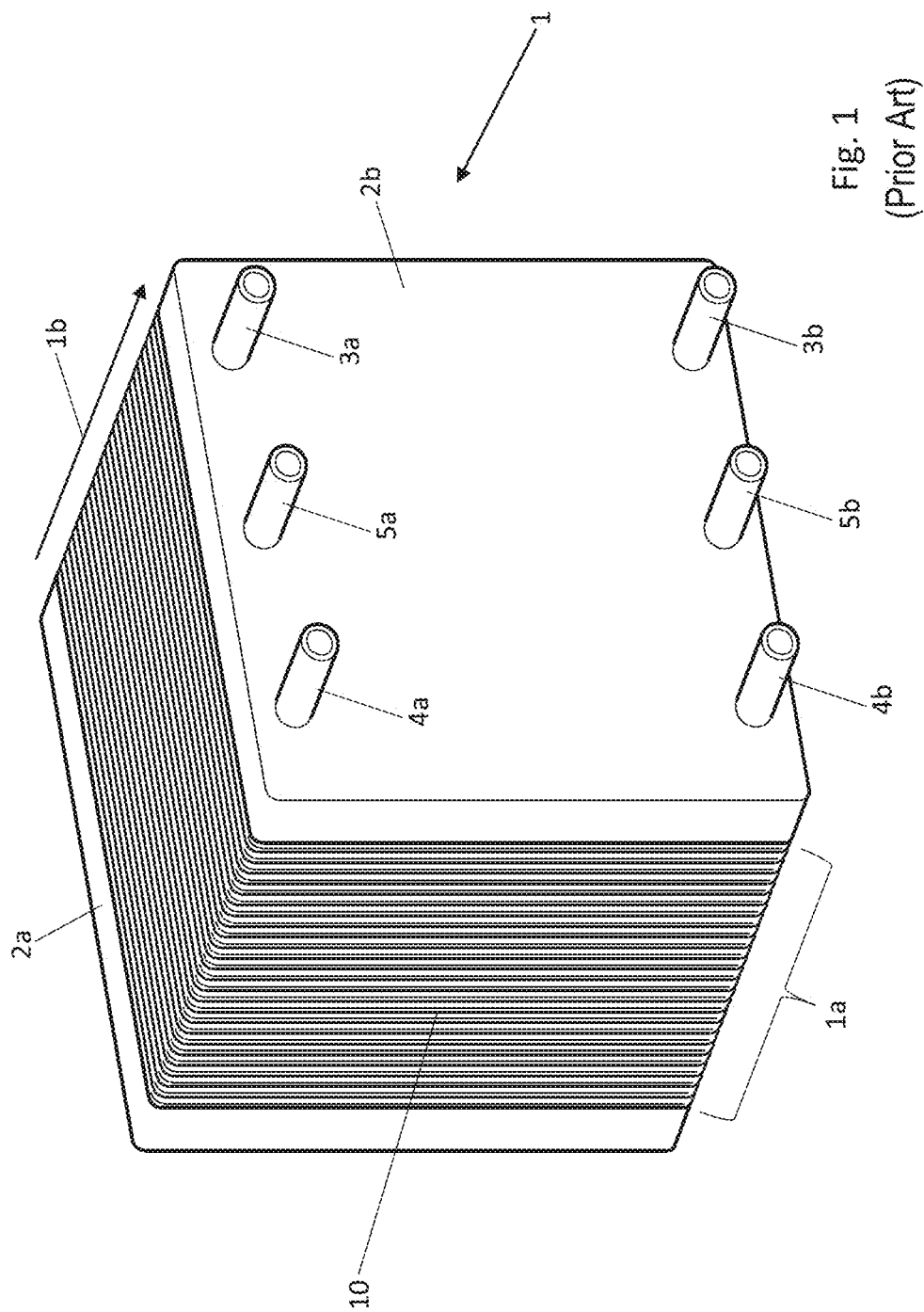
FIG. 1 shows an electrochemical system according to the prior art in a perspective view.

FIG. 1 shows an electrochemical system 1 of the type provided here, comprising a plurality of identical metallic separator plates 10, which are arranged in a stack 1a and are stacked along a stacking direction 1b extending perpendicularly to a plate plane of the separator plates 10. The separator plates 10 of the stack 1a are clamped between two end plates 2a, 2b. The separator plates 10 each comprise a first 11 and a second 12 metallic plate (see FIG. 11, for example), which are integrally joined to one another, for example. A plane in which a planar, non-deformed portion of the first plate 11 makes contact with a planar, non-deformed portion of the second plate 12 during the formation of a separator plate 10 is referred to hereafter as the plate plane of the separator plate 10. In the present example, the system 1 is a fuel cell stack. Two adjacent separator plates 10 of the stack in each case thus delimit an electrochemical cell, which is used, for example, for converting chemical energy into electrical power. An individual plate of the separator plate in each case forms a portion of another cell. The electrochemical cells typically comprise a respective membrane electrode assembly (MEA) 6, which includes an electrochemically non-active frame in the outer region thereof (see FIG. 11, for example). The MEAs 6 typically each contain at least one membrane, for example, an electrolyte membrane. Furthermore, a gas diffusion layer (GDL) can be arranged on one or both surfaces of the MEA.

In alternative embodiments, the system 1 can likewise be designed as an electrolyzer, compressor, or as a redox flow battery. Separator plates may likewise be used in these electrochemical systems. The composition of these separator plates may then correspond to the composition of the separator plates 10 that are described in greater detail here, even if the media guided on or through the separator plates in the case of an electrolyzer, in the case of an electrochemical compressor, or in the case of a redox flow battery, may in each case differ from the media used for a fuel cell system.

The end plates 2a, 2b include a plurality of media connections 3a, 3b, 4a, 4b, 5a, 5b, via which media are feedable to the system 1 and via which media are dischargeable from the system 1. These media that are feedable to the system 1 and dischargeable from the system 1 may, for example, include fuels such as molecular hydrogen or methanol, reaction gases such as air or oxygen, reaction products such as water vapor, or depleted fuels or coolants such as water and/or glycol.

Figure 2:
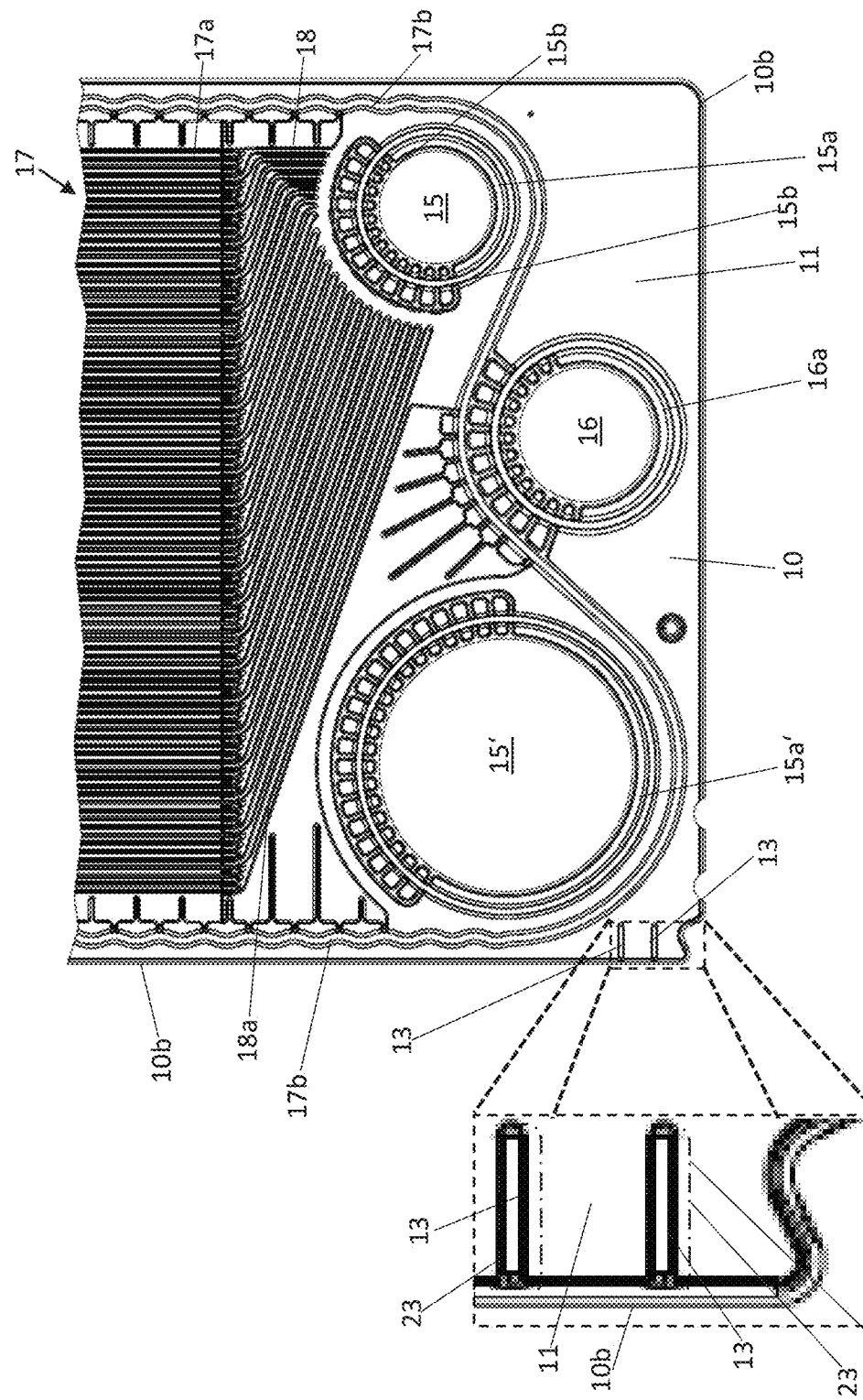
FIG. 2A shows a section of a separator plate according to the prior art in a top view.
FIG. 2B shows a detailed view of receptacles for connector pins according to the prior art.

FIG. 2A shows a section of a separator plate 10 known from the prior art in a top view, wherein the separator plate 10 according to FIG. 2A can be used, for example, in an electrochemical system of the type of the system 1 from FIG. 1. Here and hereafter, recurring features are denoted by the same reference numerals. The separator plate 10 comprises a first and a second plate 11, 12, which are integrally joined along the plate plane of the separator plate 10. Only the first plate 11 is visible in FIG. 2A, the second plate 12 being hidden by the first plate 11. The first and second plates 11, 12 can be made of a metal sheet, such as a stainless steel sheet. The plates 11, 12 have mutually aligned through-openings, which form the through-openings 15, 15' and 16 of the separator plate 10. When a plurality of separator plates of the type of the separator plate 10 are stacked, the through-openings 15, 15' and 16 form ducts extending through the stack 1a in the stacking direction 1b (see FIG. 1). Typically, each of the ducts formed by the through-openings 15, 15', 16 is in fluid connection with one of the media connections 3a, 3b, 4a, 4b, 5a, 5b in the end plates 2a, 2b of the system 1. For example, the ducts formed by the through-openings 15, 15' are used to supply the electrochemical cells of the fuel cell stack 1a with fuel and with reaction gas. In contrast, coolant can be introduced into the stack 1a or removed from the stack 1a via the duct formed by the through-opening 16.

So as to seal the through-openings 15, 15', 16 with respect to the interior of the stack 1a and with respect to the surrounding area, the first plate 11 comprises beads 15a, 15a', 16a, which are each arranged around the through-openings 15, 15', 16 and each completely enclose the through-openings 15, 15', 16. On the rear side of the separator plate 10 facing away from the observer of FIG. 2A, the second plate 12 comprises corresponding beads for sealing the through-openings 15, 15', 16 (not shown).

In an electrochemically active region 17 of the separator plate 10, the first plate 11 on the front side thereof, which faces the viewer of FIG. 2A, comprises a flow field including guidance structures 17a for guiding a reaction medium along the front side of the separator plate 10. These guidance structures 17a are provided in FIG. 2A by a plurality of webs, and channels extending between the webs and delimited by the webs. FIG. 2A only shows a section of the active region 17 on the front side of the separator plate 10. On the front side of the separator plate 10 facing the observer of FIG. 2A, the first plate 11 moreover includes a distribution or collection region 18. The distribution or collection region 18 includes distribution structures 18a that are configured to distribute a medium that, proceeding from the through-opening 15, is introduced into the distribution or collection region 18 across the active region 17 and/or to collect or to pool a medium that, proceeding from the active region 18, flows toward the through-opening 15. The distribution structures 18a of the distribution or collection area 18 in FIG. 2A are likewise provided by webs, and channels extending between the webs and delimited by the webs.

The first plate 11 furthermore comprises a perimeter bead 17b which extends circumferentially around the active region 17, the distribution or collection region 18, and the through-openings 15, 15' and seals these with respect to the surrounding area of the system 1. In the present example, the active region 17, the distribution or collection region 18 and the through-openings 15, 15' are also sealed by the perimeter bead 17b with respect to the through-opening 16, that is, with respect to the coolant circuit. However, it would likewise be possible for the through-opening 16 to be arranged inside the region enclosed by the perimeter bead. Similarly to a bead referred to as a sealing bead here, a perimeter bead is thus a sealing element. The structures of the active region 17, the distribution structures of the distribution or collection region 18, and the beads 15a, 15a', 16a and 17b are designed in one piece with the first plate 11 and are integrally formed in the first plate 11, for example in an embossing or deep drawing process.

By way of passages 15b through the bead 15a, the distribution structures 18a of the distribution or collection region 18 of the first plate 11 are in fluid connection with the through-opening 15 or with the duct through the stack 1a formed by the through-opening 15. For the sake of clarity, only a few of the passages 15b through the bead 15a in FIG. 2A are denoted by reference numerals. Likewise, the distribution structures 18a of the distribution or collection region 18 are in fluid connection with the structures or channels of the active region 17. In this way, a medium that is guided through the through-opening 15, by way of the passages 15b in the bead 15a and by way of the distribution structures 18a of the distribution or collection region 18, can be introduced into the active region 17 of the first plate 11.

The through-opening 15', or the duct through the stack 1a formed by the through-opening 15', in a corresponding manner is in fluid connection with a distribution and collection region, and, as a result, is in fluid connection with a flow field of an active region on the rear side of the separator plate 10 which faces away from the observer of FIG. 2A. In contrast, the through-opening 16, or the duct through the stack 1a formed by the through-opening 16, is in fluid connection with a cavity that is enclosed or surrounded by the first and second plates 11, 12 and designed to guide a coolant through the separator plate 10.

The first and second plates 11, 12 of the separator plate 10 of FIG. 2A arranged approximately congruently on top of one another are approximately rectangular and have rounded corners. Two receptacles 13 for connector pins are arranged next to one another in one of the corners, here adjacent the first through-opening 15' (see detailed view in FIG. 2B). The receptacles 13 are formed in each case by an elongated projection 11a and 12a in the first plate 11 and the second plate 12 (see, for example, FIGS. 5A and 5B), which extend along the plate plane 10a parallel on top of one another, from an outer edge 10b to an interior of the separator plate 10, and in the process are held together by a connecting structure 23, here a weld seam 23a. In the process, a longitudinal direction of the projections 11a, 12a, and thus also a longitudinal direction of the receptacles 13, extends at an angle of 90° with respect to the outer edge 10b. The projections 11a, 12a of the first and second plates 11, 12 furthermore protrude on opposite sides from the plate plane 10a of the separator plate 10, so that the projection 11a of the first plate 11 and the projection 12a of the second plate 12 together form an elongated receptacle 13 for a connector pin. A pin-shaped connector (connector pin) can be inserted into such a receptacle 13 and, if necessary, be secured by way of an additional locking element. The separator plate 10 can be connected to a device for checking a cell voltage of the separator plate by way of one of the two receptacles 13. Without an additional locking element, the connector pin is not secured against an inadvertent detachment from the receptacle 13 in the event of dynamic loads or vibrations, which occur, for example, during ongoing operation of a fuel cell installed in a vehicle.

Figure 3:
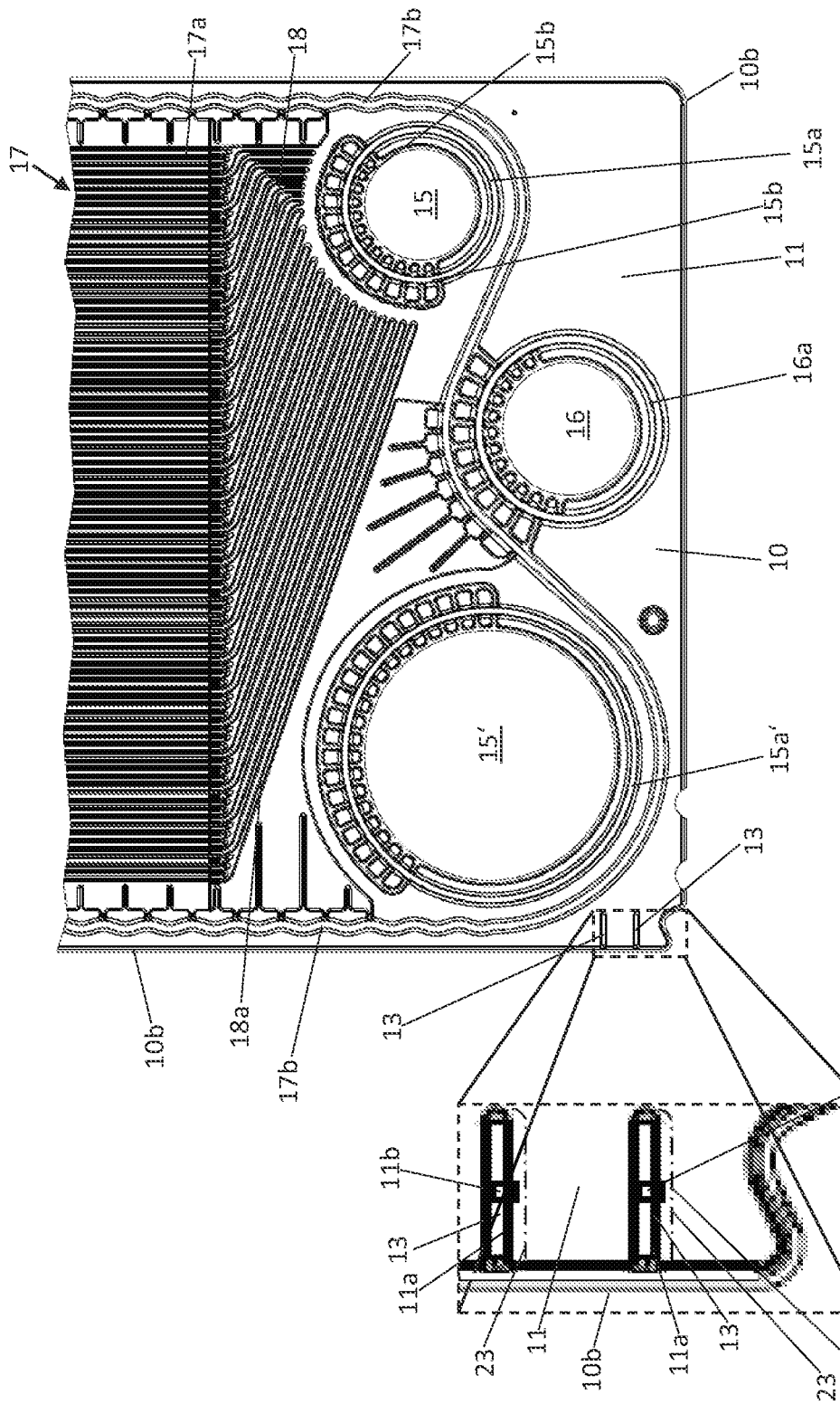
FIG. 3A shows a section of a separator plate according to a first exemplary embodiment of the invention in a top view.
FIG. 3B shows a detailed view of receptacles for connector pins according to the first exemplary embodiment of the invention.

FIG. 3A shows a section of a separator plate 10 according to the present invention. The separator plate 10 of FIG. 3A is designed similarly to that of FIG. 2A, but differs in the design of the receptacles 13 (see also the detailed view in FIG. 3B). In contrast to the receptacles 13 shown in FIG. 2A, the projection 11a of the first plate 11 visible in FIG. 3A, on the front side of the separator plate 10, includes an indentation 11b that is directed toward the second plate 12 located therebeneath for fixing a connector pin in the receptacle 13 in a force-fit and/or form-locked manner. This indentation 11b is formed in that a portion of the projection 11a of the first plate 11 is pressed into the interior of the receptacle 13, that is, a receiving portion for a connector pin, by means of embossing or a combination of cutting, for example by means of stamping, and embossing. In this way, a pressure force can additionally be exerted onto a connector pin by means of the indentation 11b, so that the connector pin can be clamped between the indentation 11b and the projection 12a of the second plate 12 in the receptacle 13. The connector pin can thus be secured against inadvertent detachment, in particular when dynamic loads or vibrations arise, even without an additional, that is external, locking element.

Figure 4:
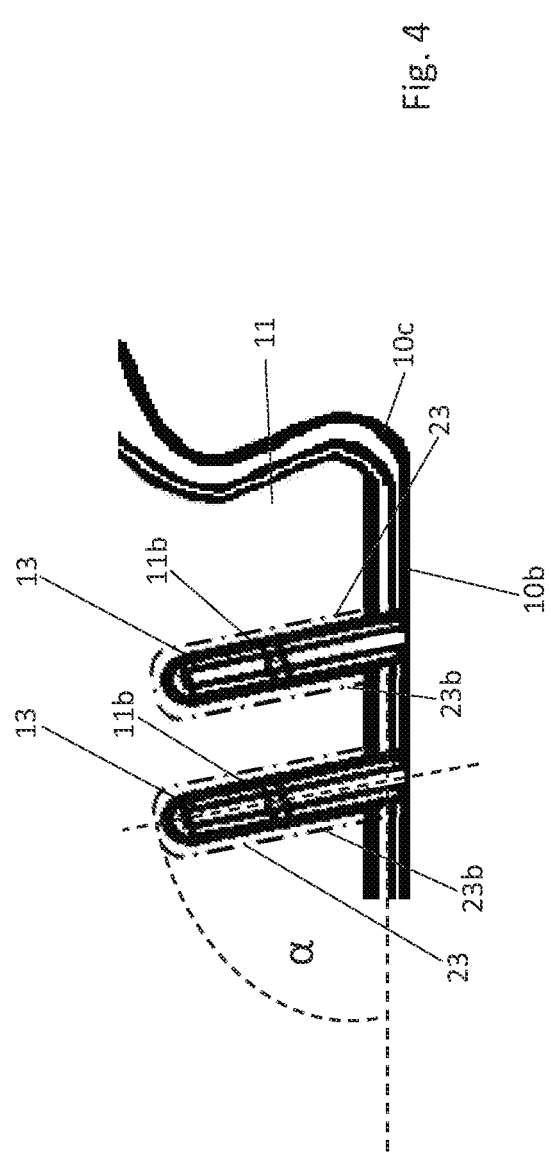
FIG. 4 shows a detailed view of receptacles for connector pins according to a second exemplary embodiment of the invention.

FIG. 4 shows a detailed view of receptacles for connector pins according to another exemplary embodiment of the invention. The receptacles 13 of FIG. 4 are designed as in FIGS. 3A and 3B, but differ in the type of the connecting structure 23, here an adhesive bond 23b, and the arrangement thereof with respect to the outer edge 10b. In FIG. 4, the receptacles 13 are formed by elongated projections 11a and 12a of the first and second plates 11, 12 which are located on top of and extend parallel to one another, wherein the projections 11a and 12a extend from the outer edge 10b into the interior of the separator plate 10. A longitudinal direction of the projections 11a, 12a, and thus also a longitudinal direction of the receptacle 13, extends at an angle α with respect to the outer edge 10b, the angle opening from the outer edge 10b of the separator plate 10 toward the interior of the separator plate 10.

FIGS. 5A and 5B show a first receptacle-connector pin connection according to the prior art in a longitudinal view and a cross-sectional view. FIGS. 5A and 5B also show different sectional views through a section through a separator plate 10 as shown in FIG. 2B. As is apparent in FIG. 5A, the separator plate 10 is essentially formed by the first and second plates 11, 12 arranged on top of one another, which make contact with one another in a planar, non-deformed region of the plates 11, 12 along the plate plane 10a of the separator plate 10. The elongated projection 11a of the first plate, which is directed perpendicularly to the plate plane 10b and away from the second plate 12 and protrudes from the plate plane 10b, extends from the outer edge 10b toward the interior of the first plate 11. The projection 12a of the second plate extends along and opposite the projection 11a from the outer edge 10b toward the interior of the separator plate 10 and, being directed perpendicularly to the plate plane 10a and away from the first plate 11, protrudes from the plate plane 10a. An elongated receptacle 13 for an elongated connector pin 14 thus forms between the projections 11a, 12a. As is apparent in FIG. 5B, the separator plate 10 includes two receptacles 13 that are arranged next to one another, as in FIGS. 2A and 2B and FIGS. 3A and 3B. The receptacles 13 moreover have an approximately square cross-section. A cylindrical connector pin having a circular cross-section is inserted into one of the two receptacles. The receptacle-connector pin connection of the prior art shown in FIGS. 5A and 5B comprise neither a clamping mechanism nor a detent mechanism. An additional external locking element necessary for securing the connection is not shown here.

FIGS. 6A and 6B show a second receptacle-connector pin connection according to the prior art in a longitudinal view and a cross-sectional view, which resembles that of FIGS. 5A, and 5B. FIGS. 6A, and 6B also again show different cross-sections through a section of a separator plate 10 in the region of the receptacles 13, as shown in FIGS. 2B and 3B. In contrast to FIGS. 5A, and 5B, the receptacles 13 have a rectangular cross-section, and the connector pin 14 inserted into one of the two receptacles 13 has a rectangular cross-section corresponding to the cross-section of the receptacles 13. The receptacle-connector pin connection of FIGS. 6A, and 6B also neither comprises a detent or clamping mechanism, nor is an additional external locking element for securing the connection shown.

FIG. 7 shows a receptacle-connector pin connection for an electrochemical system according to a first exemplary embodiment of the invention in a longitudinal sectional view. FIG. 7 shows a longitudinal sectional view analogous to FIGS. 5A, 6A. In contrast to the receptacle-connector pin connections of FIGS. 5A, 6A known from the prior art, FIG. 7 shows a clamping mechanism for securing the connection. The clamping mechanism is implemented by a stamped indentation 11b, which is deformed in the direction of the plate plane 10a, in the projection 11a of the first plate 11. The indentation 11b is composed of a partially cut-out tab that is stamped in the direction of the projection 12a and exerts a pressure force onto the connector pin 14 located in the receptacle 13. As a result of the pressure force of the indentation 11b, the connector pin 14 is pressed against the opposite projection 12a, and thereby clamped between the indentation 11b and the projection 12a.

FIG. 8 shows a receptacle-connector pin connection for an electrochemical system according to a second exemplary embodiment of the invention in a longitudinal sectional view. The second exemplary embodiment of FIG. 8 comprises a detent mechanism for securing the connection. The detent mechanism is implemented by an embossed dome-shaped indentation 11c in the projection 11a of the first plate 11, and a groove 14a, corresponding to the dome-shaped indentation 11c, in the connector pin 14 located in the receptacle 13. The indentation 11c engages in the receptacle 13 in the groove 14a of the connector pin during the insertion of the connector pin 14, thereby preventing inadvertent detachment of the connection.

Both the first exemplary embodiment of FIG. 7 and the second exemplary embodiment of FIG. 8 show reversible securing mechanisms for a receptacle-connector pin connection. This means that the receptacle-connector pin connection in the examples of FIGS. 7 and 8 can also be released again in a controlled manner, for example so as to re-contact the separator plate.

FIG. 9 shows a receptacle-connector pin connection for an electrochemical system according to a third exemplary embodiment of the invention in a longitudinal sectional view. The third exemplary embodiment of FIG. 9 likewise comprises a detent mechanism for securing the connection. The detent mechanism is implemented by a cut-out tab 11b that is bent in the direction of the second plate 12, serving as an indentation in the projection 11a, and an annular groove 14a extending circumferentially around a cross-section of a connector pin located in the receptacle 13. During the insertion of the connector pin 14, the indentation 11b of the projection 11a designed as a tab engages in the annular groove 14a of the connector pin 14, thereby preventing inadvertent detachment of the connection.

FIG. 10 shows a receptacle-connector pin connection for an electrochemical system according to a fourth exemplary embodiment of the invention in a longitudinal sectional view. The fourth exemplary embodiment of FIG. 10 likewise comprises a detent mechanism for securing the connection. The detent mechanism is implemented by a cut-out tab 11b that is bent in the direction of the second plate 12, serving as an indentation in the projection 11a, and a groove 14a, which corresponds to the indentation 11b, in a connector pin 14 located in the receptacle 13. During the insertion of the connector pin 14, the indentation 11b of the projection 11a designed as a tab engages in the groove 14a of the connector pin 14, thereby preventing inadvertent detachment of the connection.

Both the third exemplary embodiment of FIG. 9 and the fourth exemplary embodiment of FIG. 10 show irreversible securing mechanisms for a receptacle-connector pin connection. This means that the receptacle-connector pin connection in the examples of FIGS. 7 and 8 cannot be released again without damaging the receptacle-connector pin connection.

FIG. 11 shows a cross-section through a portion of an electrochemical system according to the invention prior to accommodating connector pins. FIG. 11 shows an exemplary stack 1a of four separator plates 10 arranged parallel to one another. A respective MEA 6 is arranged between the separator plates 10, so that a second plate 12 of a first separator plate 10, an MEA 6, and a first plate 11 of a second separator plate 10 in each case form an electrochemical cell. The shown cross-section extends in the vicinity of the outer edge 10b of the separator plate in an area transversely through the receptacles 13 so that it is not the electrochemically active region of the MEA, but the edge region thereof that is cut. Two receptacles 13 are arranged next to one another in a separator plate 10. The receptacles 13 of the different separator plates 10 are each arranged on top of one another in the stacking direction 1b. All receptacles 13 are connected in sections to one another by way of a connecting structure 23, here a stitch welded seam 23a, in each case from and to the outer edge.

FIG. 12 now shows a cross-section through a portion of an electrochemical system according to the invention, similarly to FIG. 11, including a first variant for the arrangement of connector pins 14. Here, a respective connector pin 14 is inserted into a receptacle 13 of a separator plate 10. The connector pins 14 are arranged offset from one another in the stacking direction 1b. This enables particularly easy insertion of the connector pins.

Figure 13:
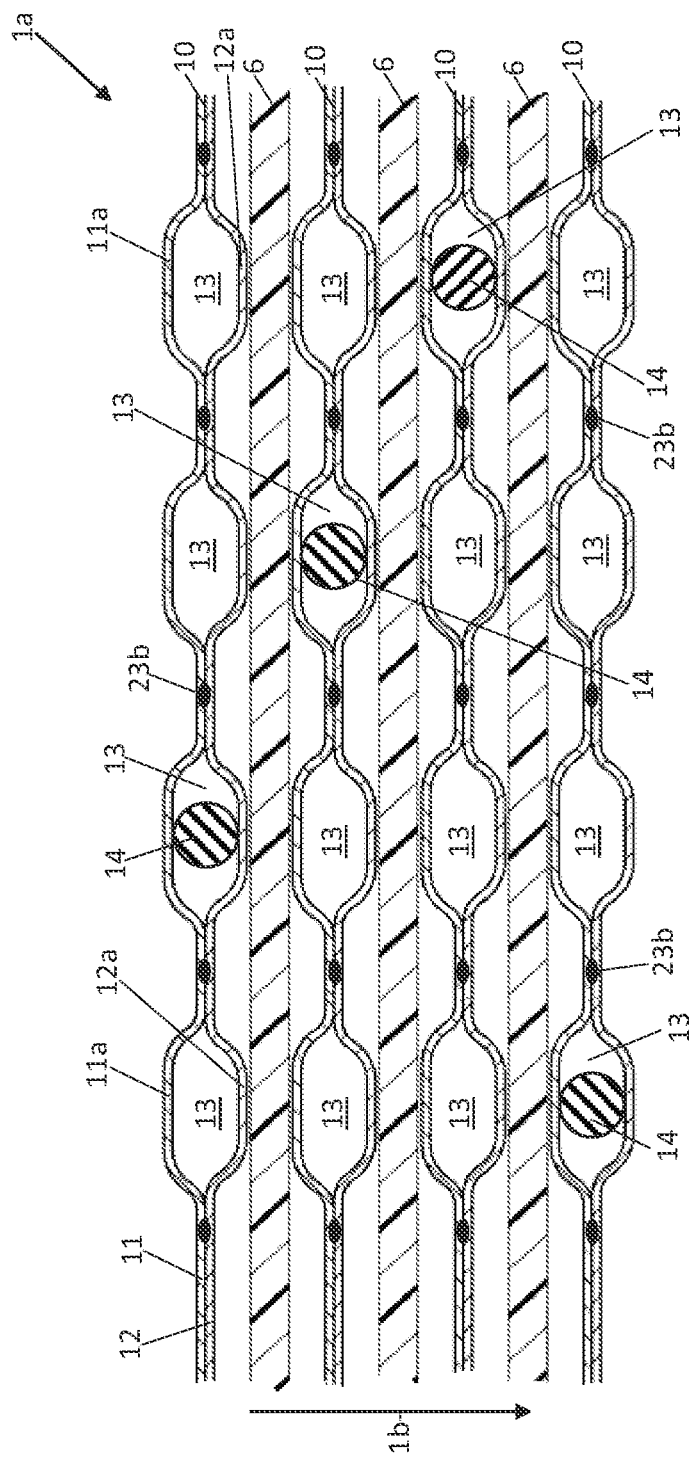
FIG. 13 shows a cross-section through a portion of an electrochemical system according to the invention with a second arrangement of connector pins.

FIG. 13 shows a cross-section through a portion of an electrochemical system according to the invention, similarly to FIG. 11, including a second variant for the arrangement of connector pins 14. In FIG. 13, each separator plate 10 includes four receptacles 13, which are each arranged beneath one another in the stacking direction 1b. The connector pins 14 are now arranged so as to be shifted by one receptacle 13 in the direction of the adjacent receptacle 13 in the stacking direction 1b from separator plate 10 to separator plate 10. The receptacle 13 accommodating a connector pin 14 is shifted in the same direction perpendicularly to the stacking direction 1b until, in this direction, no receptacle 13 is present any longer. In this case, the corresponding connector pin 14 is arranged in a receptacle 13 at the opposite end of the row of receptacles 13. In this way, likewise a maximum offset arrangement of connector pins 14 within the stack 1a is achieved. The first and second plates 11, 12 are adhesively joined to one another in sections between the receptacles 13 as well as laterally adjoining the receptacles, thereby forming a connecting structure 23b.

FIG. 14 shows a receptacle-connector pin connection for an electrochemical system according to a fifth exemplary embodiments of the invention in a longitudinal sectional view, which in contrast to the preceding exemplary embodiments does not show the first, but the second variant of the connection. The fifth exemplary embodiment of FIG. 14 includes only a projection 12a, but no projection 11a. The detent mechanism for securing the connection is implemented by a cut-out tab 11b that is bent in the direction of the second plate 12, serving as an indentation 11b in the plate 11 which is located opposite the projection 12a. During the insertion of the connector pin 14, the indentation 11b of the plate 11 designed as a tab is pressed against the surface of the connector pin 14, forms a force fit, and thus prevent inadvertent detachment of the connection.

FIG. 15 shows a receptacle-connector pin connection for an electrochemical system according to a sixth exemplary embodiments of the invention in a longitudinal sectional view, which similarly to the exemplary embodiment of FIG. 14 shows the second variant of the connection. In the sixth exemplary embodiment of FIG. 15, the designations of the individual plates 11, 12 of the separator plate 10 are reversed compared to the preceding designations, and the first plate 11 is now located beneath the second plate 12. As in FIG. 14, the separator plate 10 only includes a projection 11a in the lower plate, here thus only in the first plate 11, but no projection 12a in the upper plate 12. The detent mechanism for securing the connection is implemented by a cut-out tab 11b that is bent in the direction of the second plate 12 as an indentation in the projection 11a. During the insertion of the connector pin 14, the indentation 11b of the plate 11 designed as a tab is pressed against the surface of the connector pin 14, forming a force fit, and thus prevent inadvertent detachment of the connection.

Both the fifth exemplary embodiment of FIG. 14 and the sixth exemplary embodiment of FIG. 15 show reversible securing mechanisms for a receptacle-connector pin connection. This means that the receptacle-connector pin connection in the examples of FIGS. 14 and 15 can also be released again in a controlled manner, for example so as to re-contact the separator plate.

FIG. 16 shows a cross-section through a portion of an electrochemical system according to the invention with a third arrangement of connector pins, showing a cross-section through a plurality of receptacles 13, which as in FIG. 15 are only implemented by projections 11a in the plate 11, and the cutting plane is located in the plane that does not extend through the indentation 11b. As in FIG. 12, a respective connector pin 14 is inserted into a receptacle 13 of a separator plate 10. The connector pins 14 are arranged offset from one another in the stacking direction 1b.

FIG. 17 shows a cross-section through a portion of an electrochemical system according to the invention with a fourth arrangement of connector pins. Again, an embodiment of the second variant of receptacle-connector pin connections is shown, wherein the representation is simplified compared to the preceding ones by omitting the membrane 6 or the edge region thereof. As in FIG. 16, the cutting plane extends so as not to intersect the indentation 11b. Again, the receptacles 13 are only formed by projections 11b in the first plate, and the second plate 12 does not include any projections. However, the projections 11b are so high that the second plate 12 includes recesses 19 through which he projections 11b extend. As a result, these may be higher, for example, than the height of the sealing elements in the pressed state. This allows greater design freedom in terms of the separator plate. In the shown section, the connector pins 14 are arranged offset from one another in the stacking direction 1b, but only occupy the central two rows of receptacles 13 of those shown that extend parallel to the stacking direction 1b.

While in FIG. 17 a welded joint 23a extends at least in sections circumferentially around each of the receptacles 13, only the receptacles 13 in FIG. 16 which in fact has accommodated a connector pin are surrounded by a welded joint. While the solution of FIG. 17 mentioned first is based on a creation of an electrochemical system having as many identical parts as possible, the production time of an individual plate can be reduced in the latter case of FIG. 16.

Figure 18:
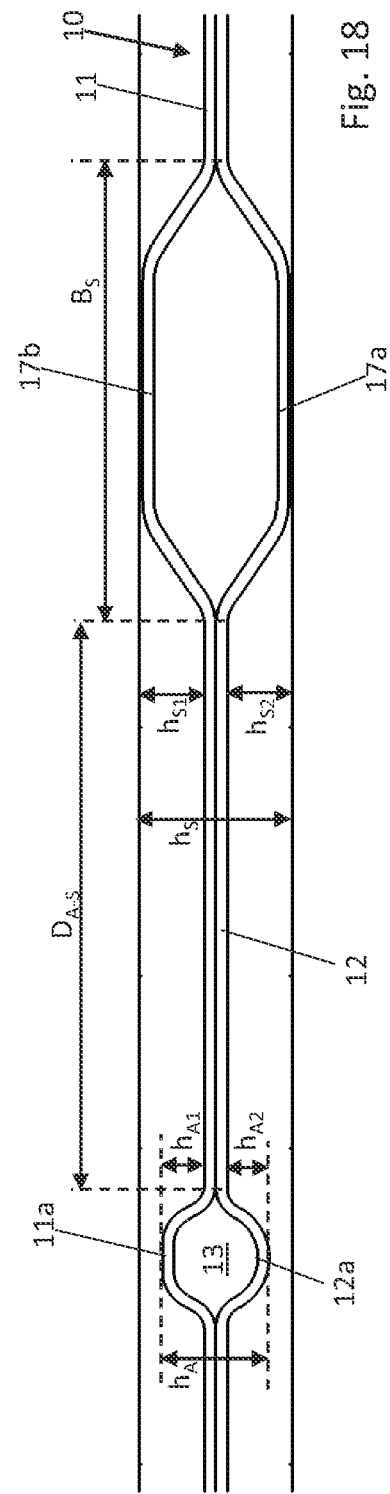
FIG. 18 shows a sectional cross-section through a separator plate.

FIG. 18 shows the height and spacing relationships in a separator plate 10 according to the invention. The height $h_{S1}$ of a bead 17b is greater than the height $h_{A1}$ of the projection 11b, here by approximately one third, both in the shown non-pressed state and in the pressed state. The same applies to the sum of the heights of the beads 17a, 17b of the separator plate 10 relative to the total height $h_A$ of the receptacle 13. The distance $D_{A-S}$ between the receptacle 13 and the bead 11b is at least 50% of the foot width $B_S$ of the bead 17b, here approximately 150%.

The invention claimed is:

1. A separator plate for an electrochemical system, comprising:
 a first and a second plate, the first and second plates being essentially congruently arranged on top of one another, the first and second plates each including at least one elongated projection, the projection of the first plate and the projection of the second plate protruding on opposite sides from a plate plane of the separator plate and extending along the plate plane parallel on top of one another, from an outer edge to an interior of the separator plate so that the projection of the first plate and the projection of the second plate together form a receptacle for a connector pin, wherein the projection of the first plate or the projection of the second plate includes an indentation directed toward a respective opposite plate for fixing the connector pin in the receptacle in a force-fit and/or form-locked manner, and wherein the receptacle extends from the outer edge to a location in the interior of the separator plate that is outside a perimeter of a sealing structure.

2. A separator plate for an electrochemical system, comprising:

a first and a second plate, the first and second plates being essentially congruently arranged on top of one another, the first or the second plate including at least one elongated projection, the projection of the first plate or the projection of the second plate protruding toward a side that is directed away from the other plate from a plate plane of the separator plate and extending along the plate plane from an outer edge to an interior of the separator plate, so that the projection of the first plate or the projection of the second plate forms a receptacle for a connector pin, wherein the projection of the first plate or the projection of the second plate, or a region in the second plate located opposite the projection of the first plate or a region in the first plate located opposite the projection of the second plate, includes an indentation that is directed toward the respective opposite plate, for fixing the connector pin in the receptacle in a force-fit and/or form-locked manner, and wherein the receptacle extends from the outer edge to a location in the interior of the separator plate that is outside a perimeter of a sealing structure.

3. The separator plate according to claim 1, wherein the first and/or second plates include a plurality of projections that protrude from the plate plane of the separator plate and extend from the outer edge to the interior of the separator plate, so that the plurality of projections of the first and/or second plates form a plurality of receptacles for connector pins.

4. The separator plate according to claim 1, wherein the indentation is designed as a cut-out tab or as a dome-shaped embossment.

5. The separator plate according to claim 1, wherein the projections extend at an angle with respect to the outer edge, the angle being >0° and <180°, in particular >45° and ≤90°, or in particular ≥90° and <135°, particularly ≥80° and/or ≤100°.

6. The separator plate according to claim 1, wherein the first and second plates include in each case at least one mutually aligned first through-opening for conducting a reaction medium through the separator plate;

in each case at least one mutually aligned second through-opening for conducting a coolant through the separator plate;

in each case, on a surface thereof facing away from one another, an active region including guidance structures for guiding a reaction medium along the plate plane; and a distribution region, which is in fluid connection with the first through-opening and the active region and includes distribution structures, for distributing a reaction medium that is introduced into the active region from the first through-opening and/or for collecting a reaction medium flowing from the active region toward the first through-opening.

7. The separator plate according to claim 6, wherein the first and second plates each comprise a first sealing structure, extending circumferentially around the first through-opening, for sealing the first through-opening along the plate plane, the first sealing structure including at least one first passage, by way of which the first through-opening is in fluid connection with the distribution region and the active region.

8. The separator plate according to claim 6, wherein the first and second plates comprise a second sealing structure for sealing the second through-opening along the plate plane.

9. The separator plate according to claim 6, wherein the first and second plates comprise a third sealing structure, which extends circumferentially around the active region, the distribution region and the first through-opening and seals these with respect to the surrounding area along the plate plane.

10. The separator plate according to claim 6, wherein the first, second and/or third sealing structures are embossed into the first or second plate or are designed as sealing beads embossed into the first and second plates.

11. The separator plate according to claim 10, wherein the first, second and third sealing structures of the first plate, and the first, second and third sealing structures of the second plate protrude from the plate plane of the separator plate on opposite sides, and a height of the projections, by which the projections protrude from the plate plane of the separator plate, is less than a height of the first, second and third sealing structures, by which the first, second and third sealing structures protrude from the plate plane of the separator plate.

12. An electrochemical system, comprising a plurality of separator plates which are arranged parallel to one another, each separator plate, comprising:

a first and a second plate, the first and second plates being essentially congruently arranged on top of one another, the first and second plates each including at least one elongated projection, the projection of the first plate and the projection of the second plate protruding on opposite sides from a plate plane of the separator plate and extending along the plate plane parallel on top of one another, from an outer edge to an interior of the separator plate so that the projection of the first plate and the projection of the second plate together form a receptacle for a connector pin, wherein the projection of the first plate or the projection of the second plate includes an indentation directed toward a respective opposite plate for fixing the connector pin in the receptacle in a force-fit and/or form-locked manner, and wherein the receptacle extends from the outer edge to a location in the interior of the separator plate that is outside a perimeter of a sealing structure.

13. The electrochemical system according to claim 12, wherein a membrane of an electrochemical cell for converting chemical energy into electrical power is arranged between each two adjacent separator plates.

14. The electrochemical system according to claim 13, wherein an edge region of the membrane abuts the at least one elongated projection of the first or second plate.

15. The electrochemical system according to claim 14, further comprising a device for checking a cell voltage of a separator plate, wherein the device comprises the connector pin being insertable into the connector pin of the separator plate.

16. The electrochemical system according to claim 15, wherein the connector pins have a substantially cylindrical or cuboid design, in particular with rounded corners.

17. An electrochemical system according to claim 15, wherein the connector pins include a recess, corresponding to the indentation, for fixing the connector pins in the receptacles in a force-fit and/or form-locked manner.

18. The electrochemical system according to claim 17, wherein the recess is designed as a groove and/or as a groove extending around the connector pin in a transverse direction.

19. The electrochemical system according to claim 17, wherein the force-fit and/or form-locked fixation of the connector pins in the receptacles is reversible or irreversible.

20. The electrochemical system according to claim 17, wherein, in a projection of n adjacent separator plates, in a direction perpendicular to the plate plane of the separator plates where $n \geq 1$ and/or $n \leq 4$, the connector pins are insertable into the separator plates offset from one another.

* * * * *